United States Patent Office 3,250,791
Patented May 10, 1966

3,250,791
TETRACYANOETHYLENE OXIDE AND PROCESS FOR PREPARING SAME
Owen W. Webster, Wilmington, Del., assignor to E. I. du Pont de Nemours and Company, Wilmington, Del., a corporation of Delaware
No Drawing. Filed Dec. 29, 1961, Ser. No. 163,034
8 Claims. (Cl. 260—348)

This invention is concerned with, and has as its principal objects, the provision of a novel process for oxidizing tetracyanoethylenides and a new composition of matter which may be obtained therefrom.

This application is a continuation-in-part of application U.S. Serial No. 58,634, filed September 27, 1960, now abandoned.

The discovery of tetracyanoethylene has opened up the field of cyanocarbon chemistry and has made possible many interesting subsequent discoveries. For example, it has been found that tetracyanoethylene is conveted to the corresponding tetracyanoethylenide $[C_6N_4 + e \rightarrow C_6N_4^-]$ when coupled with a reducing species having a half-wave potential more negative than $+0.15$ volt when measured at a dropping mercury electrode in acetonitrile containing 0.1 M $LiClO_4$ against the aqueous saturated calomel electrode. It has also been found that tetracyanoethylenides are converted to the corresponding pentacyanopropenides by the action of molecular oxygen.

It has now been discovered that the oxidation of tetracyanoethylenides with hydroperoxides at a pH below 7 yields tetracyanoethylene oxide, a new composition of matter.

Hydroperoxides suitable for preparing tetracyanoethylene oxide according to this invention are those compounds having the characteristic structure —O—O—H. This class includes hydrogen peroxide, the organic peracids (percarboxylic acids), the organic hydroperoxides and the inorganic hydroperoxides. Organic peracids include compounds such as performic acid, peracetic acid, pertrifluoroacetic acid, perbenzoic acid, monoperphthalic acid, and the like. Organic hydroperoxides include such compounds as methyl hydroperoxide, ethyl hydroperoxide, n-propyl hydroperoxide, n-butyl hydroperoxide, tert.-butyl hydroperoxide, cyclopentylmethyl hydroperoxide, cyclohexylmethyl hydroperoxide, cumene hydroperoxide, diisopropylbenzene hydroperoxide, p-menthane hydroperoxide, and the like. Inorganic hydroperoxides include monoperoxyphosphoric acid, percarbonic acid, perboric acid, persulfuric acid, pertitanic acid ($H_2TiO_4 \cdot H_2O$), perchromic acid, Caro's acid ($H_2SO_5$), sodium monopersulfate, and the like. The inorganic peracids are readily obtained in situ when the corresponding metal salts (sodium perborate, sodium persulfate, etc.) are exposed to the acidic media required for the practice of this invention. Hydrogen peroxide may similarly be obtained in situ by contacting a metal peroxide (sodium peroxide, barium peroxide, etc.) with the acid medium employed in this invention.

The preferred hydroperoxides, because they are more readily available, are hydrogen peroxide and the above-illustrated organic peracids.

One means for isolating tetracyanoethylene oxide from its mixtures with tetracyanoethylene, some of which is also obtained in this process, involves treatment of the mixture with a diene, e.g., isoprene at a temperature of about 80° C. This converts tetracyanoethylene to its Diels-Adler adduct. From the resulting mixture tetracyanoethylene oxide is separated by sublimation and may be further purified by recrystallization if desired.

The process of this invention may be carried out under a wide variety of conditions. The reaction conditions are not restrictive since it suffices to bring a tetracyanoethylenide and a hydroperoxide into intimate contact for sufficient time to convert a substantial portion of the tetracyanoethylenide to tetracyanoethylene oxide.

Temperature is not a critical factor in the process of this invention, and therefore, it is convenient to carry out the process at room temperature, but temperatures far below and far above room temperature are also operable. Temperatures ranging up to the decomposition temperature of the reactants or products, whichever is lower, may be employed. In general, temperatures from $-100°$ C. to $+250°$ C. are preferred and particularly temperatures in the range of $-100$ to $+200°$ C.

Pressure is not a critical factor in the process of this invention, and pressures both below and above atmospheric pressure may be employed. Since the presence of molecular oxygen in any atmosphere which is in contact with the reactants of this invention leads to a low yield through formation of by-product pentacyanopropenides, it is preferred to carry out the process of this invention in the substantial absence of molecular oxygen. In most of the examples below, the substantial absence of oxygen is obtained by blanketing the reaction with nitrogen. Reduced access of oxygen may also be obtained by employing other inert gases, such as helium, argon, and the like, by operating under reduced pressure or by other means known in the art.

No reaction medium is required for carrying out the process of this invention, but the use of a liquid diluent which is inert to the reactants and products is often convenient. Suitable diluents include water, acetonitrile, ethers such as diethyl ether, tetrahydrofuran, 1,2-dimethoxyethane, and the like.

The molar ratio of hydroperoxide to tetracyanoethylenide which is operable in this invention is not critical, because any time that quantitative amounts of these two components are contacted at a pH below 7, at least some tetracyanoethylene oxide will form. However, for practical purposes, excesses beyond twentyfold of either component are to be avoided and molar ratios between 1:1 and 4:1 are preferred.

Tetracyanoethylenides, i.e., salts containing the $$(C_6N_4^-.)$$

ion-radical, are the starting materials in the process of this invention, and they may be readily prepared in numerous ways. For example, alkali metal and alkaline earth metal tetracyanoethylenides may be prepared by the direct reaction of tetracyanoethylene with a metal as disclosed in co-assigned application U.S. Serial No. 12,975, filed March 7, 1960. Ammonium (including substituted ammonium) and sulfonium tetracyanoethylenides, etc., may be prepared by the direct reaction of a mixture of tetracyanoethylene and tetracyanoethane with, e.g., ammonia or an amine, thioether, etc., as disclosed in co-assigned application U.S. Serial No. 57,152, filed September 20, 1960. The preferred tetracyanoethylenides are the alkali metal, alkaline earth metal, and ammonium (particularly the lower alkyl-substituted ammonium) tetracyanoethylenides.

In the following examples, parts are by weight unless otherwise indicated.

EXAMPLE I

Part A.—A mixture of 300 parts of dry potassium iodide and 170 parts of tetracyanoethylene is placed in a glass reactor. The system is evacuated and then filled with nitrogen. About 3,920 parts of acetonitrile is added, and the resulting suspension is agitated for four hours at room temperature. Filtration yields 114 parts of potassium tetracyanoethylenide in the form of bronze-colored crystals.

*Part B.*—To a solution of 3.4 parts of 30% hydrogen peroxide in 103.3 parts of 1 N sulfuric acid is added five parts of potassium tetracyanoethylenide. The resulting slurry is stirred for three minutes at room temperature. The solid product is collected by filtration and dried to yield 2.9 parts of a mixture which is shown by infrared absorption analysis to contain a trace of unreacted tetracyanethylenide, a substantial amount of tetracyanoethylene, and a major portion of tetracyanoethylene oxide. This crude product is first purified by sublimation at reduced pressure to yield 1.6 parts of a crystalline mixture of tetracyanoethylene and tetracyanoethylene oxide. This mixture is dissolved in 176 parts of benzene, and a solution of 2.2 parts of anthracene in 264 parts of benzene is added. The solution first turns green and then colorless as the tetracyanoethylene/anthracene Diels-Alder adduct separate as a precipitate. This is removed by filtration, and the filtrate is evaporated to dryness under reduced pressure to yield crude tetracyanoethylene oxide. This is heated at 80° C./0.3 mm. for one hour to yield, by sublimation, 0.1 part of tetracyanoethylene oxide in the form of a colorless crystalline solid. Its infrared absorption spectrum shows bands at 2280, 1300, 1180, 1150, 1110, 1040, 945, and 890 cm.$^{-1}$.

EXAMPLE II

To a solution of 46 parts of 30% hydrogen peroxide in 1033 parts of 1 N sulfuric acid is added 67 parts of potassium tetracyanoethylenide. The mixture is stirred for 30 seconds at room temperature. The precipitate is collected by filtration and dried under reduced pressure. There is obtained 37.5 parts of a light brown solid which is shown by infrared analysis to contain approximately equal parts of tetracyanoethylene and tetracyanoethylene oxide along with a trace of tetracyanoethane. This mixture is dissolved in 235 parts of acetonitrile and 34 parts of isoprene is added. After one hour the solvent is removed by evaporation under reduced pressure. The remaining residue is heated at 80° C./0.3 mm. for about five hours to yield, by sublimation, 24 parts of tetracyanoethylene oxide melting at 171–176° C. This product is further purified by recrystallization from benzene, followed by resublimation to yield tetracyanoethylene oxide in the form of colorless needles. The mass spectrum of this product shows a peak at 144, as well as fragmentation peaks which one would associate with tetracyanoethylene oxide. The infrared absorption spectrum is in agreement with the assigned structure.

*Analysis.*—Calcd. for $C_6N_4O$ (wt. percent): C, 50.03; H, 0.00; N, 38.87. Found (wt. percent): C, 50.10; H, 0.10; N, 38.85.

In this, as in the preceding example, sulfuric acid was added to maintain the pH below 7 as required for the production of tetracyanoethylene oxide. As would be apparent to one skilled in the chemical arts, any acids which will not partake in deleterious side reactions under the reaction conditions, e.g., the mineral acids, are suitable in the production of tetracyanoethylene oxide.

Although Examples I and II are directed to the oxidation of potassium tetracyanoethylenide with hydrogen peroxide, it is to be understood that this invention is generic to and includes the use of any hydroperoxide to oxidize a tetracyanoethylenide at a pH below 7. Irrespective of the particular hydroperoxide or tetracyanoethylenide employed in the subject process, the reaction mechanism is of chemical necessity identical and in all respects equivalent. Thus, each of the hydroperoxides mentioned in the description preceding Examples I and II, e.g., performic acid, peracetic acid, petrifluoroacetic acid, perbenzoic acid, monoperphthalic acid, and tert.-butyl hydroperoxide, etc., is equivalent to and may be substituted for hydrogen peroxide in the process of Example I or II. Similarly, other salts of tetracyanoethylene which can be prepared by the processes described in the aforesaid co-assigned application (Ser. No. 12,975 and Ser. No. 57,152), e.g., sodium calcium, barium, ammonium, tetramethylammonium, or trimethylsulfonium tetracyanoethylenide, are equivalent to and may be substituted for potassium tetracyanoethylenide in the process of Example I or II.

Tetracyanoethylene oxide is useful as a reducing component in thrust-producing fuels. It may be combined with liquid or solid oxidizing agents either prior to use or at the time of ignition, and may be burned in rocket motors known in the art for directing the thrust from such an oxidation reaction. The thrust-producing capacity of tetracyanoethylene oxide may be illustrated as follows:

EXAMPLE A

A cellulosic tube closed at one end and having an inside diameter of approximately 5 mm. and a length of approximately 50 mm. is packed with an intimate mixture of one part of tetracyanoethylene oxide and three parts of potassium perchlorate. The tube is placed on a horizontal support and fired by ignition of the mixture at the open end of the tube with an illuminating gas flame. The mixture burns rapidly and smoothly and the thrust from the oxidation reaction propels the rocket with great force.

Since obvious modifications and equivalents in the invention will be evident to those skilled in the chemical arts, I propose to be bound solely by the appended claims.

The embodiments of the invention in which an exclusive property or privilege is claimed are defined as follows:

1. Tetracyanoethylene oxide.
2. Process which comprises contacting a tetracyanoethylenide of the group consisting of alkali metal, alkaline earth metal, ammonium and sulfonium tetracyanoethylenides with a hydroperoxide at a pH below 7.
3. The process of claim 2 conducted at a temperature of −100° C. to 250° C.
4. The process of claim 2 conducted in the substantial absence of molecular oxygen.
5. The process of claim 2 wherein the hydroperoxide is hydrogen peroxide.
6. The process of claim 2 wherein the tetracyanoethylenide is an alkali metal tetracyanoethylenide.
7. In a process for preparing tetracyanoethylene oxide from tetracyanoethylene, the step of contacting a tetracyanoethylenide of the group consisting of alkali metal, alkaline earth metal, ammonium and sulfonium tetracyanoethylenides with a hydroperoxide at a pH below 7.
8. The process of preparing tetracyanoethylene oxide which comprises contacting potassium tetracyanoethylenide with hydrogen peroxide at a pH below 7.

References Cited by the Examiner

UNITED STATES PATENTS

| | | | |
|---|---|---|---|
| 2,724,719 | 11/1955 | Markley et al. | 260—348 |
| 2,766,246 | 10/1950 | Middleton | 260—465.8 |
| 2,271,470 | 11/1956 | Mark | 260—348.5 |
| 2,976,301 | 3/1961 | Miller | 260—348 |

FOREIGN PATENTS 807,605   1/1959   Great Britain.

OTHER REFERENCES

Cairns et al.: J. Am. Chem. Soc., volume 80, pages 2775–2844 (1958).

Payne et al.: J. Org. Chem., volume 24, pages 54–55 (1959).

Payne: J. Am. Chem. Soc., volume 81, pages 4901–4903 (1959).

WALTER A. MODANCE, *Primary Examiner.*

DUVAL T. McCUTCHEN, NICHOLAS S. RIZZO,
*Examiners.*